(12) United States Patent
Chang et al.

(10) Patent No.: US 9,794,183 B2
(45) Date of Patent: *Oct. 17, 2017

(54) INTERCONNECT FLOW CONTROL

(71) Applicant: EMC Corporation, Hopkinton, MA (US)

(72) Inventors: Lei Chang, Beijing (CN); Tao Ma, Beijing (CN); Lirong Jian, Beijing (CN); Kurt Harriman, Novato, CA (US); Zhanwei Wang, Beijing (CN); Lili Ma, Beijing (CN)

(73) Assignee: EMC IP Holding Co. LLC, Hopkinton, MA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/871,321

(22) Filed: Sep. 30, 2015

(65) Prior Publication Data
US 2016/0099877 A1    Apr. 7, 2016

Related U.S. Application Data

(63) Continuation of application No. 13/925,985, filed on Jun. 25, 2013, now Pat. No. 9,178,834.

(51) Int. Cl.
| | | |
|---|---|---|
| *H04L 12/28* | (2006.01) |
| *H04L 12/835* | (2013.01) |
| *H04L 12/863* | (2013.01) |
| *H04L 12/861* | (2013.01) |
| *H04L 12/64* | (2006.01) |
| *H04L 12/26* | (2006.01) |
| *H04L 12/807* | (2013.01) |

(52) U.S. Cl.
CPC ......... *H04L 47/30* (2013.01); *H04L 12/6418* (2013.01); *H04L 43/022* (2013.01); *H04L 47/27* (2013.01); *H04L 47/6255* (2013.01); *H04L 49/90* (2013.01)

(58) Field of Classification Search
CPC combination set(s) only.
See application file for complete search history.

(56) References Cited

U.S. PATENT DOCUMENTS

| | | | |
|---|---|---|---|
| 6,401,136 B1 * | 6/2002 | Britton .................... | G06F 9/546 719/314 |
| 6,434,620 B1 * | 8/2002 | Boucher ............. | H04L 12/5693 709/230 |
| 2011/0131654 A1 * | 6/2011 | Taneja ................ | H04L 63/1416 726/23 |

OTHER PUBLICATIONS

Chang et al, HAWQ: A Massively Parallel Processing SQL Engine in Hadoop, ACM, 12 pages, Jun. 2014.*

* cited by examiner

*Primary Examiner* — Frank Duong
(74) *Attorney, Agent, or Firm* — Barry N. Young

(57) ABSTRACT

A communication technique which includes determining, at least in part by comparing data associated with a packet that has been pulled from a received packet queue with a highest sequence number among packets that have been placed in the received packet queue, that the received packet queue has space available to receive a further packet. A receiver with which the received packet queue is associated is sent, based at least in part on the determination, a next packet.

20 Claims, 7 Drawing Sheets

INTERCONNECT FLOW CONTROL

CROSS REFERENCE TO OTHER APPLICATIONS

This application is a continuation of co-pending U.S. patent application Ser. No. 13/925,985, entitled INTERCONNECT FLOW CONTROL filed Jun. 25, 2013 which is incorporated herein by reference for all purposes.

BACKGROUND OF THE INVENTION

Communication between nodes in a distributed system can be performed in a number of ways. For example, an application or other process can send commands and/or data to another host on an Internet Protocol (IP) or other network using a communication protocol such as the User Datagram Protocol (UDP). However, the efficiency with which a sending application makes use of the hardware and other capabilities of the intervening communication network may vary greatly depending on how the sending and receiving nodes are configured and in particular how they implement and use the selected communication protocol. For example, at one extreme a sending node may send too many packets to the receiver, even when the receiver queues are full, and may continue to resend packets that are dropped due to receiver queue overflow, until a packet is acknowledged as having been received. If a more conservative approach is used to send packets, the receiver may not become overwhelmed, but on the other hand performance may be affected by the slow rate of communication, and the available bandwidth (hardware capacity) may not be utilized fully.

BRIEF DESCRIPTION OF THE DRAWINGS

Various embodiments of the invention are disclosed in the following detailed description and the accompanying drawings.

DETAILED DESCRIPTION

Figure 1:
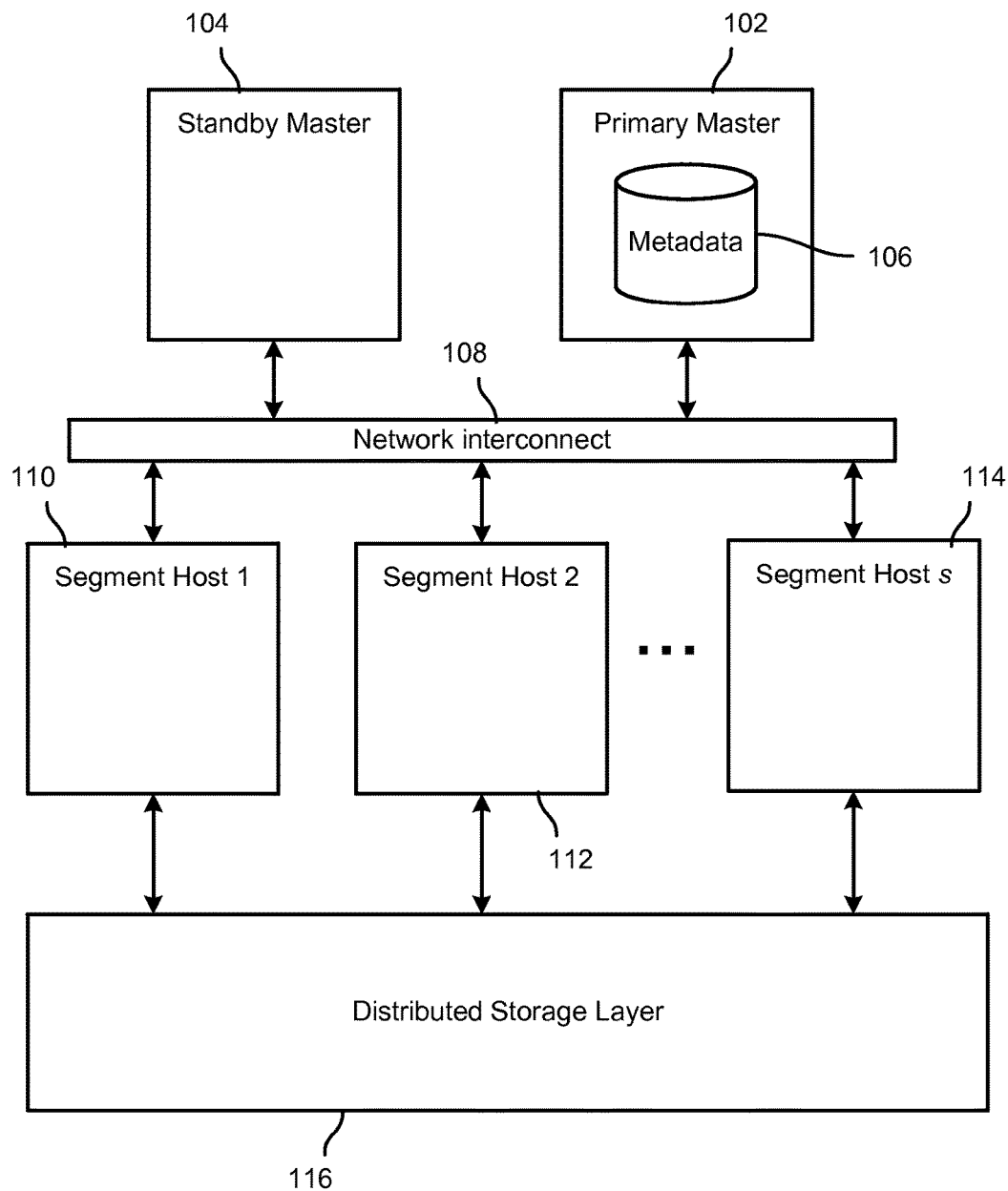
FIG. 1 is a block diagram illustrating an embodiment of a large scale distributed system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A network interconnect to provide communication among nodes in a large-scale distributed system is disclosed. In various embodiments, the distributed system includes multiple senders and multiple receivers. Each sender has a connection to each receiver. Each connection has a sender queue, and an "unack" queue used to keep track of which sent packets have been acknowledged. At the same time, in various embodiments each packet in the unack queue is also represented in a queue in an "Unack Queue Ring" that is used to determine that a packet has "expired" without having been acknowledged and needs to be resent.

In various embodiments, when a sender fills up a packet, it adds it to the send queue. The sender tries to send the next packet in the send queue only if the sender knows there are free buffers for the packet in the receiver side queue. In various embodiments, this determination is based at least in part on feedback from the receiver. For example, in various embodiments, a main receiver thread that consumes and processes packets that have been received and placed in a receiver side queue includes in an acknowledgement (ack) message a sequence number of the packet pulled from the queue and also a highest sequence number received by a receiver side background thread that listens on the receiver side port and receives packets from the sender(s) and places them in the receiver side queues. The sender uses the received information to determine whether there is room in the receiver side queues for more packets. If not, the sender waits, for example until new information indicates there is room at the receiver side, or for a prescribe wait interval, etc.

FIG. 1 is a block diagram illustrating an embodiment of a large scale distributed system. In the example shown, the large scale distributed system includes a large cluster of commodity servers. The master hosts include a primary master 102 and a standby master 104. The primary master 102 is responsible for accepting queries; planning queries, e.g., based at least in part on system metadata 106, which in various embodiments includes information indicating where data is stored within the system; dispatching queries to segments for execution; and collecting the results from segments. The standby master 104 is a warm backup of the primary master 102. The network interconnect 108 is used to communicate tuples between execution processes. The compute unit of the database engine is called a "segment". Each of a large number of segment hosts, represented in FIG. 1 by hosts 110, 112, and 114, can have multiple segments. The segments on segment hosts 110, 112, 114, for example, are configured to execute tasks assigned by the primary master 102, such as to perform assigned portions of a query plan with respect to data stored in distributed storage layer 116, e.g., a Hadoop® or other storage layer.

When the master node 102 accepts a query, it is parsed and planned according to the statistics of the tables in the query, e.g., based on metadata 106. After the planning phase, a query plan is generated. A query plan is sliced into many slices. In query execution phase, a "gang" or other grouping of segments is allocated for each slice to execute the slices. In M*N dispatching, the size of the gangs is dynamically determined by using the knowledge of the data distribution and available resources.

Figure 2:
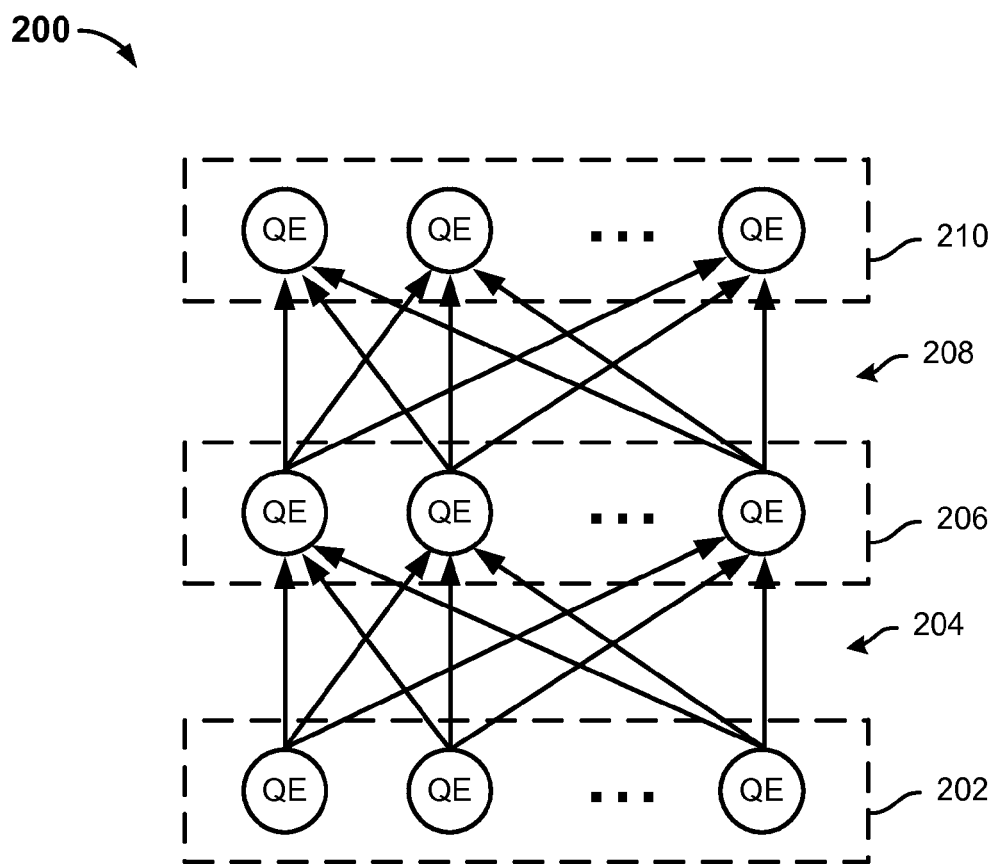
FIG. 2 is a block diagram illustrating an embodiment of a distributed system.

FIG. 2 is a block diagram illustrating an embodiment of a distributed system. In the example shown, a first (upstream) gang 202 includes multiple "query execution" threads, indicated in FIG. 2 by the capital letters "QE". The processes in gang 202 communicate via a set of sender-receiver connections 204 over a network interconnect, such as network interconnect 108 of FIG. 1, with a next downstream gang 206 of query execution threads and/or other processes. In turn, the processes comprising gang 206 communicate via a set of sender-receiver connections 208 over a network interconnect, such as network interconnect 108 of FIG. 1, with a next downstream gang 210 of query execution threads and/or other processes. In the example shown, the gangs 202, 206, and 210 comprise a pipeline, with processes at each level performing processing and passing a result to a next downstream level for further processing.

Figure 3:
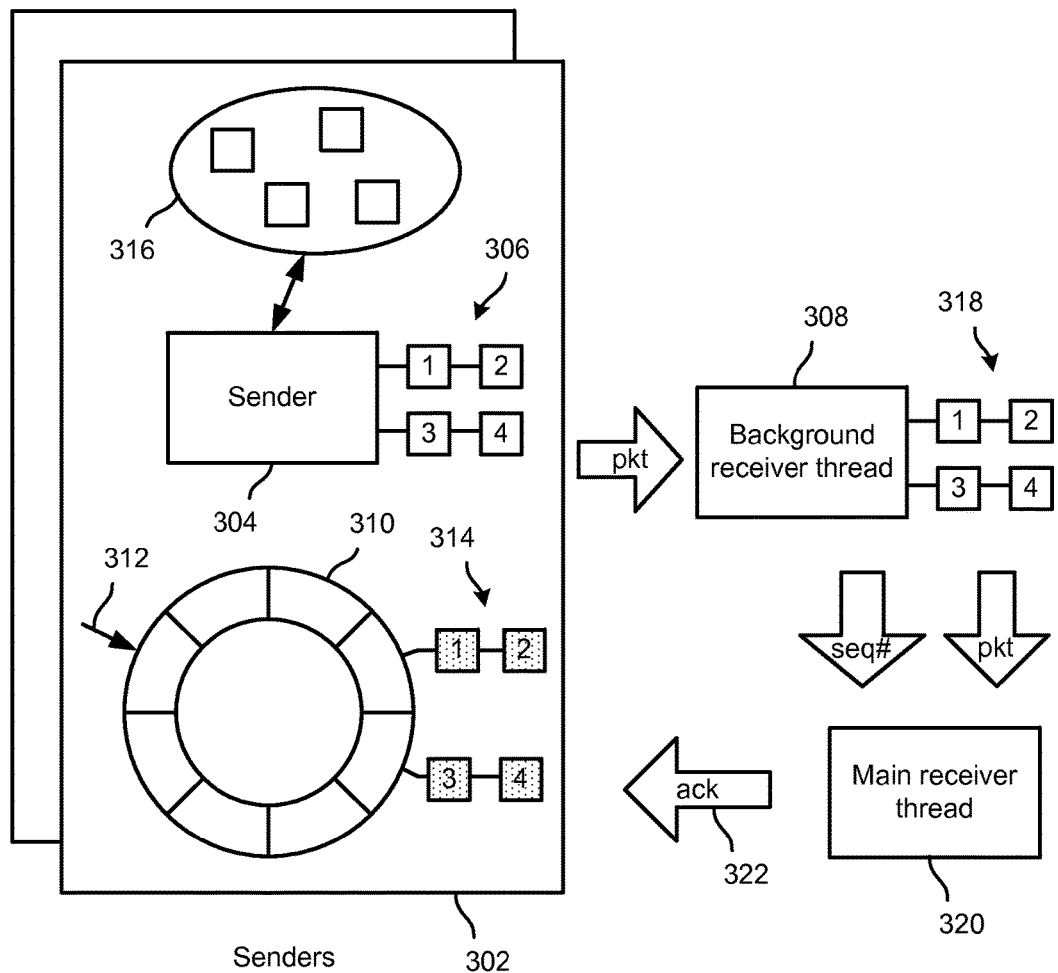
FIG. 3 is a block diagram illustrating an embodiment of an interconnect with flow control.

FIG. 3 is a block diagram illustrating an embodiment of an interconnect with flow control. In the example shown, a plurality of senders 302, e.g., the sending QE's shown in FIG. 2, each includes a sender process 304 and associated sending packet queues 306. Packets are sent by sender 304 via a sender-receiver connection over a network interconnect, such as network interconnect 108 of FIG. 1. Packets are received at the receiver by a background receiver thread 308, which places received packets in available buffers in a received packet queue.

After the sender 304 sends a packet, the sender 304 moves the packet to the unack queue (not shown), and also inserts an entry in the corresponding place of an "unack queue ring" 310. In the example shown, a current time is indicated by a pointer 312, while unack queue ring entries 314 represent the packets that have been sent at corresponding times in the past associated with the locations on the ring in which the respective entries are stored. In various embodiments, the unack queue ring is used to determine when a packet is expired. Each slot of the ring represents a fixed time span, for example 1 ms. If the current time pointer 312 (time t) points to slot 1, then slot 2 represents the time span from t+1 ms to t+2 ms, and so on. When the unack queue ring 310 is used check whether there are packets that have expired without having been acknowledged, in some embodiments processing starts from the least current time, and all the packets that remain in the unack queue are resent, until the slot that the updated current time points to is reached.

In various embodiments, an attempt to resend a packet that has not been acknowledged is not made until an expiration period has expired. For example, in some embodiments, a round trip time (RTT) is computed as the time between when a packet is sent and when the acknowledgement for the packet is received. When an acknowledgement is received, the RTT is updated by using the following equation:

$$RTT = RTT \times \mu + \text{new\_RTT} \times (1-\mu) \quad (0 < u < 1)$$

In various embodiments, a limitation of the max value and min value for RTT is set. In some embodiments, the expiration period determines the timing of when a packet may be resent. A long RTT means a long expiration period. In some embodiments, the following formula to compute the period. (In the following formula, a is a constant. In some embodiments, a value of a=4 is used):

$$\exp_{period} = a \times RTT$$

Referring further to FIG. 3, when a sender finishes sending its buffer (send queue), it tries to get a buffer from the free buffer pool 316; and if there is no free buffer left, it waits, and tries to get acknowledgements from the receivers. After getting acknowledgements for unacked packets, packets are removed from the unack queue and the unack queue ring. The sender 304 also checks the unack queue ring to see whether there are some expired packets. If there are some, it retransmits those packets and moves them to other queues in the ring (to ensure the retransmitted packet is not retransmitted until at least after the RTT-based expiration period, for example).

At the receiver side, there are two threads, the background receiver thread 308 is listening on a port and accepts packets from all senders. When the background receiver thread 308 receives a packet, it places it into the corresponding queue 318. The main thread 320 continuously picks up packets from the receive queues 318. After the main thread 320 consumes the packet, it sends an acknowledgement 322 to the corresponding sender. The acknowledgement packet contains the sequence number of the packet the main thread already consumed and is acknowledging, and also the largest packet sequence number among the packets that have been received by background receiver thread 308 from that sender. The sender 304 uses the information received via the ack 322 to determine whether there is free space available in the receive queue. If so, the sender 304 sends a next packet. Otherwise, the sender 304 waits, for example until a subsequent ack 322 contains data indicating there is free space available in the receive queue.

Figure 4:
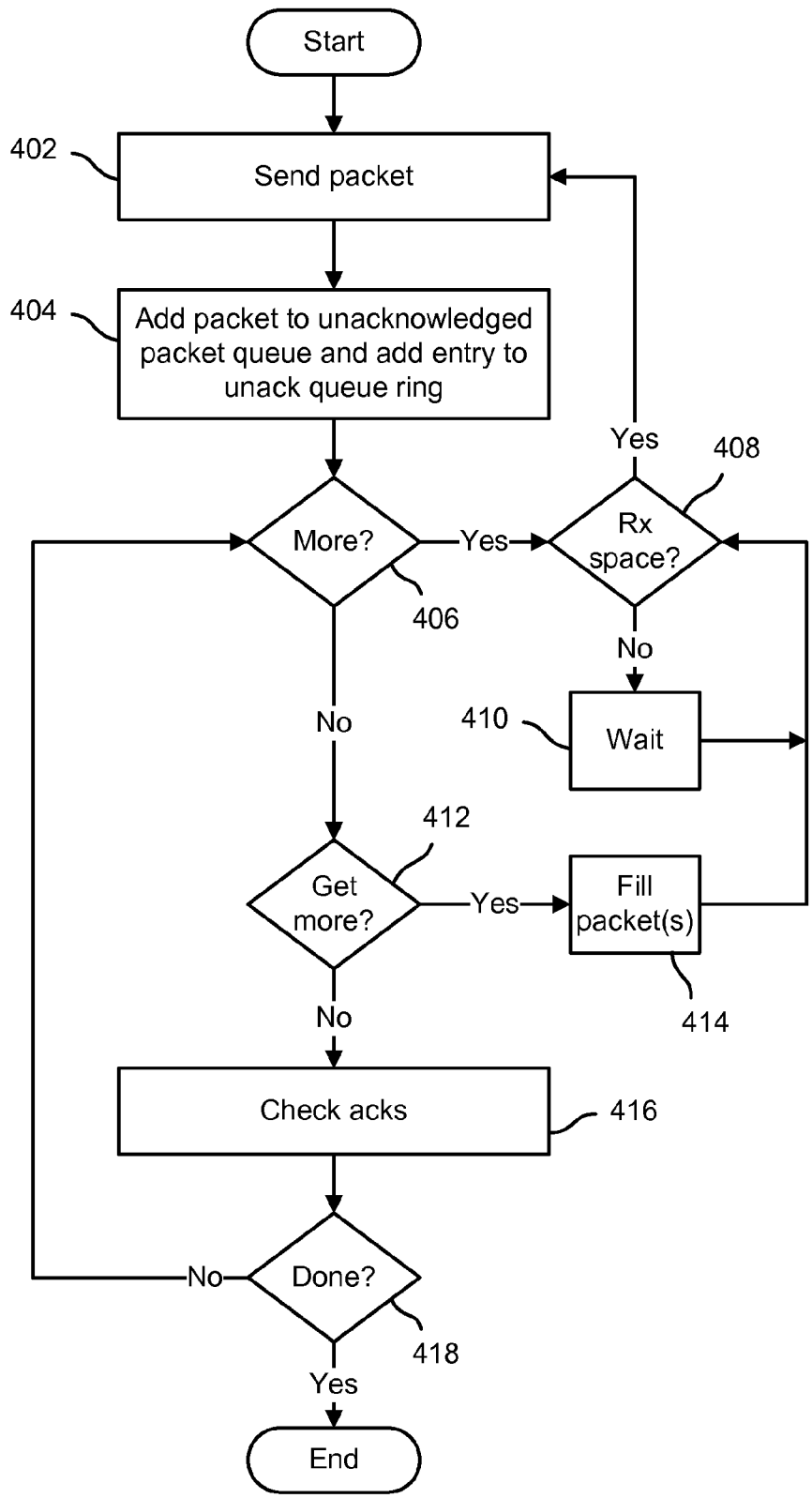
FIG. 4 is a flow chart illustrating an embodiment of a process to send packets via a network interconnect flow control.

FIG. 4 is a flow chart illustrating an embodiment of a process to send packets via a network interconnect flow control. In the example shown, a packet is sent (402) and added to an unacknowledged (unack) queue, and an entry is made in an unack queue ring (404). If more packets are available to be sent (406) a determination is made as to whether the receiver has room in its receive queue for a further packet (408). If not, the sender waits (410) until there is room. Once it the receiver is determined to have room for further packets (408), a next packet is sent (402). If no more packets are available to be sent (406), the sender attempts to get a free buffer, e.g., from a free buffer pool, and generate more packets to be sent (412, 414). If no free buffer is available (412), the sender checks for acknowledgement (ack) messages from the respective receivers. The sender also checks the unack queue ring, as described above, to see whether there are some expired packets. If there are some, the sender retransmits the packets and moves them to other queues in the ring. Processing continues until the sender finishes sending data (418).

Figure 5:
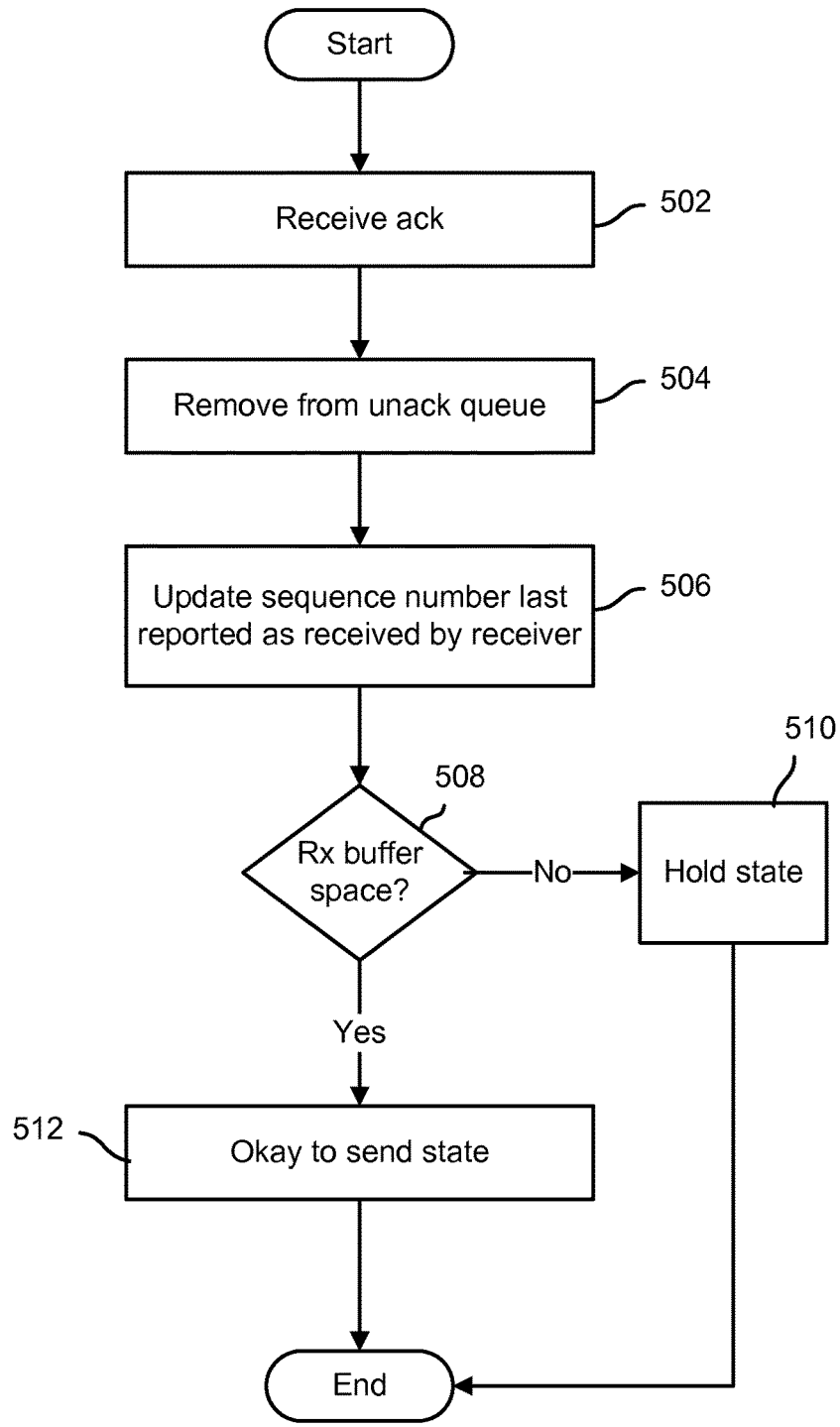
FIG. 5 is a flow chart illustrating an embodiment of a process to determine receiver-side ability to receive further packets.

FIG. 5 is a flow chart illustrating an embodiment of a process to determine receiver-side ability to receive further packets. In various embodiments, the process of FIG. 5 is used to make the determination at step 408 of FIG. 4. In the example shown, an ack message is received (502). The sent message that is acknowledged by the ack message is removed from an unack queue (504). A "highest" received sequence number data included in the ack message is used to update a corresponding value at the sender (506). The highest sequence number reported by the receiver as having been received is compared to the sequence number of the packet acknowledged in the ack message to determine whether the receiver has buffers available in its receive queue (508). For example, if the sender knows the receiver has a receive queue capable of holding 10 packets, the ack message acknowledges a packet sequence number "3" and the highest sequence number reported as having been received by the receiver is "13,", in various embodiments the sender may conclude that the receiver does not have space in its receive queue, which would be determined to be full with packets "4" through "13". If the receiver is determined not to have space in its receive queue (508), the sender concludes it should wait (510); otherwise, the sender concludes it is okay to send a next packet (512).

Figure 6:
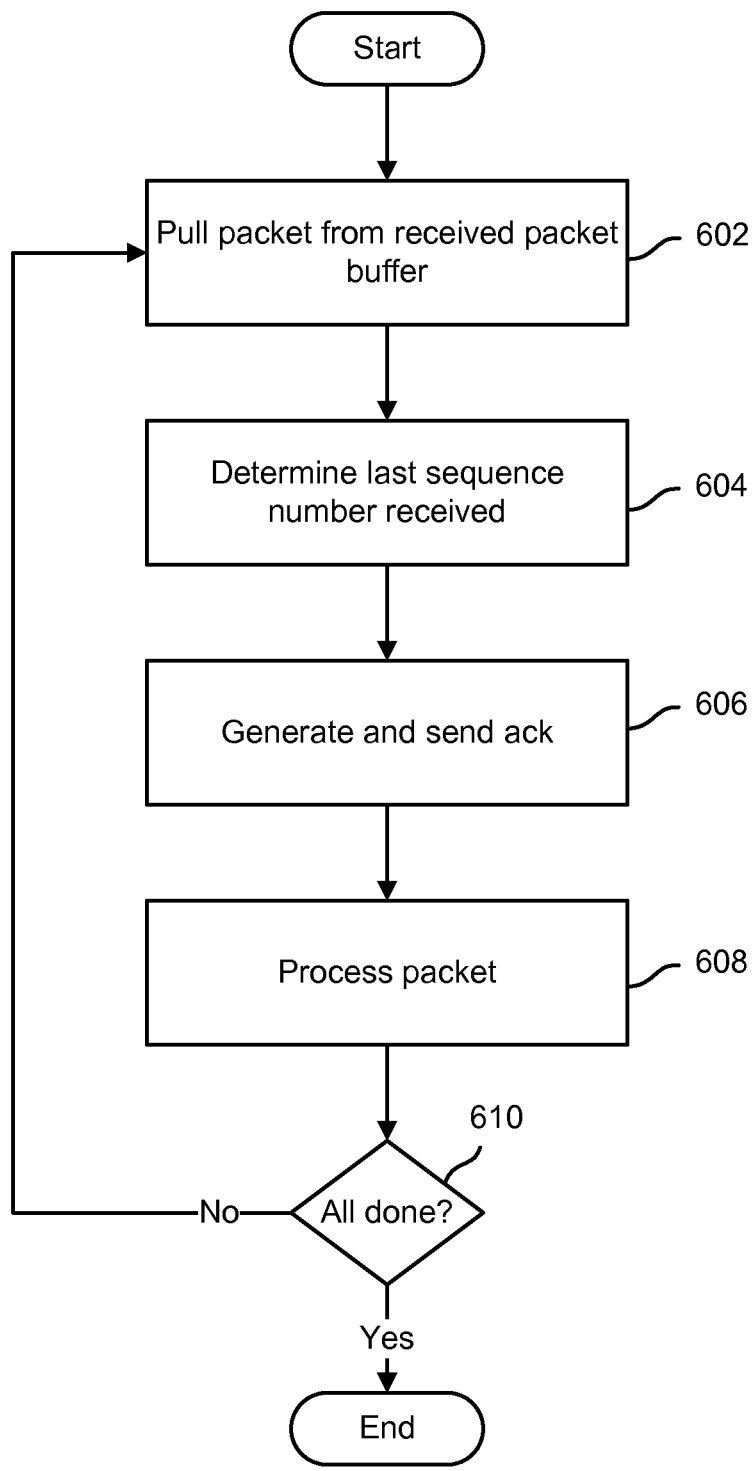
FIG. 6 is a flow chart illustrating an embodiment of a process to acknowledge packets.

FIG. 6 is a flow chart illustrating an embodiment of a process to acknowledge packets. In various embodiments, the process of FIG. 6 is implemented by a main receiver thread that consumes packets from a received packet queue, such as main receiver thread 320 of FIG. 3. In the example shown, a packet is pulled from a received packet buffer (602). A highest sequence number among packets that have been received and placed in a received packet queue from which the packet was pulled is determined (604). An ack message is generated and sent (606). In various embodiments, the ack message includes and/or includes data derived from the highest sequence number among packets that have been received in addition to data identifying the consumed packet that is being acknowledged. Processing of the packet on the receiver end continues (608) as needed, for example to complete a task assigned to be performed at the receiver prior to passing a result to a next (downstream) level of processing. Acknowledgement of consumed packets continues as successive packets are pulled from the received packet buffers, until done (610), e.g., the sender has finished sending packets and all have been processed.

Figure 7:
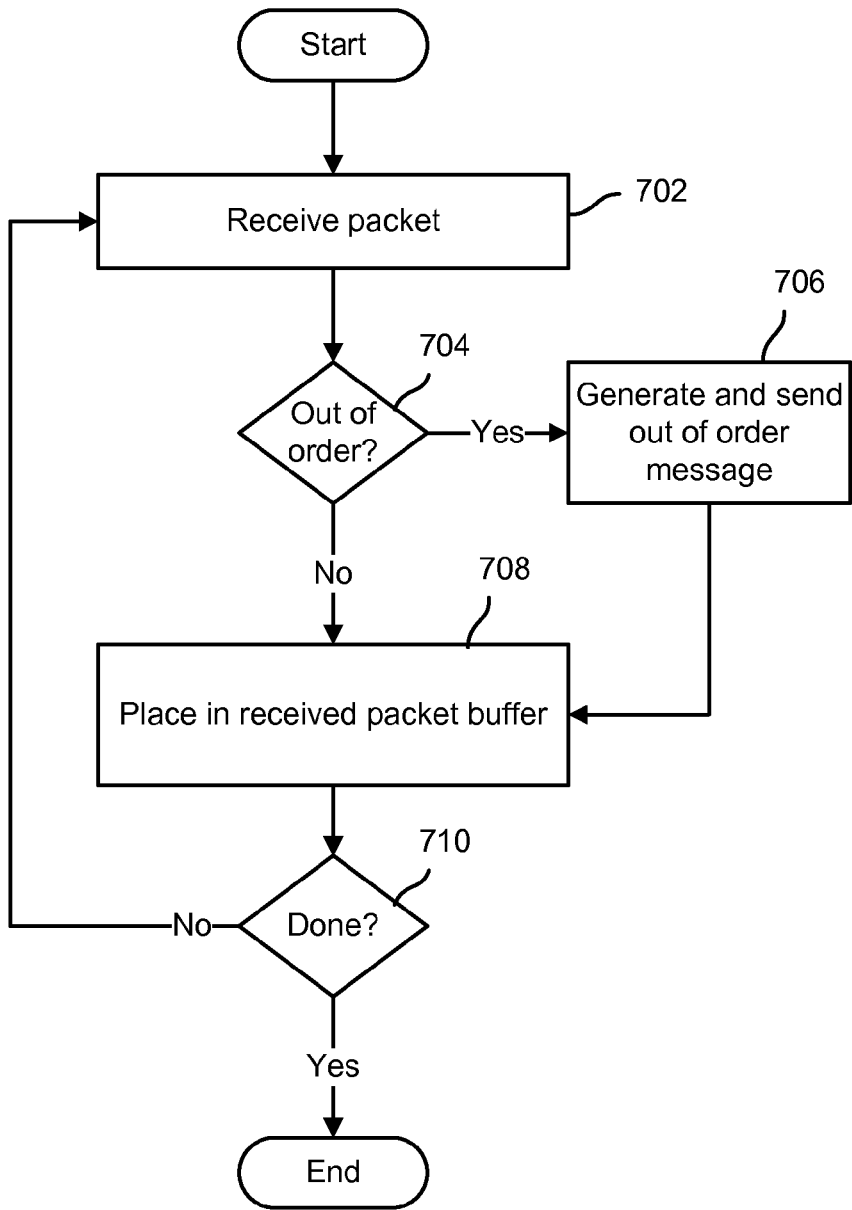
FIG. 7 is a flow chart illustrating an embodiment of a process to report out of order packets.

FIG. 7 is a flow chart illustrating an embodiment of a process to report out of order packets. In a typical system, packets received out of order may be discarded, and retransmission of any missing/dropped packet, along with subsequent packets, may be relied upon to ensure all packets are received and processed in order. Such an approach may lead to a high number of retransmits, including the inefficient discarding and retransmission of packets that are needed at the receiver but were received out of order. In the approach shown in FIG. 7, by contrast, packets received out of order are retained and a message is sent to alert the sender of the need to retransmit any intervening packets that have not been received. Upon receiving a packet (702), a determination is made, for example based on sequence numbers, whether the packet was received out of order (704). If so, an "out of order" message is generated and sent to the sender (706). In either case, i.e., whether the received packet was received out of order or not (704), the received packet is place in a received packet buffer (708). For example, if the receiver receives packets with sequence numbers 1, 2, and 4, an "out of order" message may be sent after receipt of the packet with sequence number 4, but the packet with sequence number 4 will not be discarded. Instead, the receiver will retain the packet with sequence number 4, and will wait for the sender to retransmit the packet with the missing sequence number 3, for example in response to the "out of order" message sent by the receiver. In some embodiments, a ring buffer is used to detect that a packet has been received out of order, without the overhead that may be required to sort the packets that have been received. Processing continues until done (710), for example all packets have been received.

Using techniques disclosed herein, quick and efficient communication between nodes in a large-scale distributed system is provided, and more full and effective utilization of network interconnect hardware capacity may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of communicating, comprising:
   determining, at least in part by comparing data associated with a packet that has been pulled from a received packet queue with a highest sequence number among packets that have been placed in the received packet queue, that the received packet queue has space available to receive a further packet; and
   sending based at least in part on the determination, to a receiver with which the received packet queue is associated, a next packet;
   wherein the data associated with the packet that has been pulled from the received packet queue is received by a sender of the packet in an acknowledgement sent by a receiver of the packet, the data associated with the packet including a sequence number of the packet, and wherein the sender is configured to compare the sequence number of the packet with said highest sequence number to make said determination that the received packet queue has space available to receive said further packet.

2. The method of claim 1, wherein the determination is made at a sender from which the next packet is sent.

3. The method of claim 1, further comprising waiting to send a subsequent packet based at least in part on the determination that the received packet queue is full.

4. The method of claim 1, wherein the determination is made based at least in part on data sent by a master receiver thread that pulled the packet from the received packet queue.

5. The method of claim 4, wherein the packet is placed in the received packet queue by a background receiver thread configured to receive packets sent via a network interconnect and place them in the received packet queue.

6. The method of claim 5, wherein the master receiver thread receives the highest sequence number from the background receiver thread.

7. The method of claim 6, wherein the master receiver thread includes the highest sequence number in an acknowledgement message sent to acknowledge receipt of the packet.

8. The method of claim 1, wherein the determination is made at a sender of the packet in response to an acknowledgement (ack) message received at the sender.

9. A system for communicating, comprising:
   a processor; and
   a memory coupled with the processor, wherein the memory is configured to provide the processor with instructions which when executed cause the processor to:

determine, at least in part by comparing data associated with a packet that has been pulled from a received packet queue with a highest sequence number among packets that have been placed in the received packet queue, that the received packet queue has space available to receive a further packet; and send based at least in part on the determination, to a receiver with which the received packet queue is associated, a next packet;

wherein the data associated with the packet that has been pulled from the received packet queue is received by a sender of the packet in an acknowledgement sent by a receiver of the packet, the data associated with the packet including a sequence number of the packet, and wherein the sender is configured to compare the sequence number of the packet with said highest sequence number to make said determination that the received packet queue has space available to receive said further packet.

10. The system of claim 9, wherein the determination is made at a sender from which the next packet is sent.

11. The system of claim 9, wherein the instructions further cause the processor to wait to send a subsequent packet based at least in part on the determination that the received packet queue is full.

12. The system of claim 9, wherein the determination is made based at least in part on data sent by a master receiver thread that pulled the packet from the received packet queue.

13. The system of claim 12, wherein the packet is placed in the received packet queue by a background receiver thread configured to receive packets sent via a network interconnect and place them in the received packet queue.

14. The system of claim 13, wherein the master receiver thread receives the highest sequence number from the background receiver thread.

15. The system of claim 14, wherein the master receiver thread includes the highest sequence number in an acknowledgement message sent to acknowledge receipt of the packet.

16. The system of claim 9, wherein the determination is made at a sender of the packet in response to an acknowledgement (ack) message received at the sender.

17. A computer program product for communicating, the computer program product being embodied in a non-transitory computer readable storage medium and comprising computer instructions for:

determining, at least in part by comparing data associated with a packet that has been pulled from a received packet queue with a highest sequence number among packets that have been placed in the received packet queue, that the received packet queue has space available to receive a further packet; and sending based at least in part on the determination, to a receiver with which the received packet queue is associated, a next packet;

wherein the data associated with the packet that has been pulled from the received packet queue is received by a sender of the packet in an acknowledgement sent by a receiver of the packet, the data associated with the packet including a sequence number of the packet, and wherein the sender is configured to compare the sequence number of the packet with said highest sequence number to make said determination that the received packet queue has space available to receive said further packet.

18. The computer program product of claim 17, wherein the determination is made based at least in part on data sent by a master receiver thread that pulled the packet from the received packet queue.

19. The computer program product of claim 18, wherein the packet is placed in the received packet queue by a background receiver thread configured to receive packets sent via a network interconnect and place them in the received packet queue.

20. The computer program product of claim 19, wherein the master receiver thread receives the highest sequence number from the background receiver thread.

* * * * *